United States Patent [19]

Swan et al.

[11] Patent Number: 5,661,697

[45] Date of Patent: Aug. 26, 1997

[54] METHOD AND APPARATUS FOR DETECTION OF SAND FORMATIONS IN AMPLITUDE-VERSUS-OFFSET SEISMIC SURVEYS

[75] Inventors: Herbert W. Swan, Richardson; Kenneth O. McDowell, Midland; James A. Specht, Plano, all of Tex.

[73] Assignee: Atlantic Richfield Company, Los Angeles, Calif.

[21] Appl. No.: 574,209

[22] Filed: Dec. 18, 1995

[51] Int. Cl.$^6$ .............................. G01V 1/36; G01V 1/34
[52] U.S. Cl. .................. 367/47; 367/21; 367/59; 367/70; 364/421
[58] Field of Search .............................. 367/21, 47, 59, 367/70; 364/421

[56] References Cited

U.S. PATENT DOCUMENTS

| | | | |
|---|---|---|---|
| 3,681,748 | 8/1972 | Diltz | 367/63 |
| 4,853,902 | 8/1989 | Corrigan | 367/44 |
| 4,995,007 | 2/1991 | Corcoran et al. | 367/52 |
| 5,258,960 | 11/1993 | Swan | 367/38 |
| 5,297,108 | 3/1994 | Swan | 367/38 |
| 5,440,525 | 8/1995 | Dey-Sarkar et al. | 367/52 |
| 5,463,594 | 10/1995 | Lindsey et al. | 367/38 |
| 5,515,335 | 5/1996 | Swan | 367/47 |

OTHER PUBLICATIONS

Peddy et al, Leading Edge, vol. 14, #8, pp. 871–877, Aug. 1995.

Swan, "Properties of direct AVO hydrocarbon indicators", Offset–dependent reflectivity—Theory and Practice of AVO Analysis (Castagna, J.P. & Backus, M.M., eds., Soc. Expl. Geophys., 1993), pp. 78–92.

Linville, "Single–channel digital filter design for seismic applications", Geophysics, 59 (1994), pp. 1584–1592.

Taner, et al., "Complex Seismic Trace Analysis", Geophysics, vol. 44, No. 6 (Jun., 1979), pp.1041–1063.

Primary Examiner—Nelson Moskowitz
Attorney, Agent, or Firm—Anderson, Levine & Lintel

[57] ABSTRACT

A method and apparatus for analyzing amplitude-versus-offset (AVO) seismic data to distinguish sand formations, such as Morrow sands, from limestones and other similar intervals, is disclosed. For each of the traces in the survey, AVO intercept and AVO slope traces are generated, preferably after normalization of the amplitudes of the traces to account for geophone coupling variations. After normalization and conventional processing and corrections, spatial summation may be performed to further improve the traces. AVO trend lines are then generated, preferably on a weighted window basis, to generate localized trend lines against which the intercept and slope values of individual depth points may be compared. This comparison allows the plotting of AVO intercept versus AVO slope deviation from the trend line, from which sand formation interfaces may be identified by their presence in certain quadrants of the intercept-slope deviation cross-plot.

25 Claims, 8 Drawing Sheets
(2 of 8 Sheet(s) in Color)

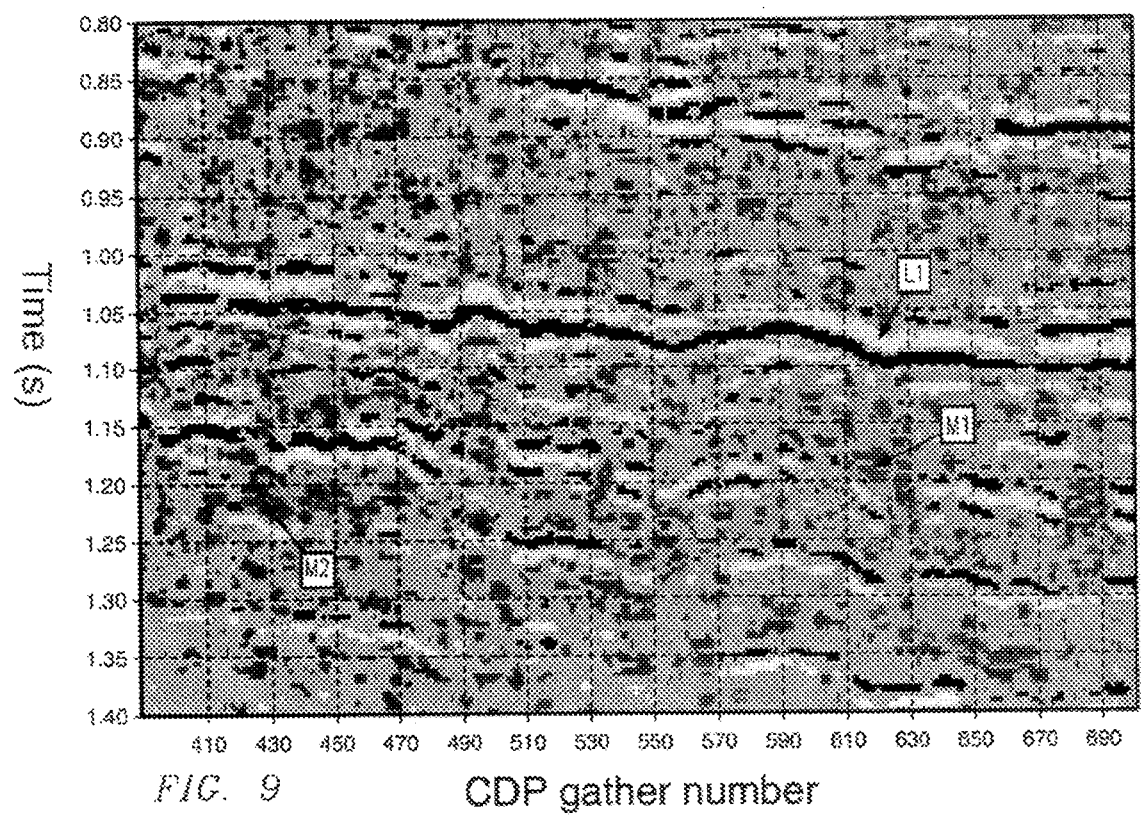
FIG. 9        CDP gather number

METHOD AND APPARATUS FOR DETECTION OF SAND FORMATIONS IN AMPLITUDE-VERSUS-OFFSET SEISMIC SURVEYS

This invention is in the field of geological exploration, and is more particularly directed to analysis of seismic survey information to detect hydrocarbon-bearing sand formations.

BACKGROUND OF THE INVENTION

As is well known in the field of oil and gas prospecting, certain geological formations are more likely to contain hydrocarbon products (i.e., oil and natural gas) than others; the field of seismic surveying regions of the earth in prospecting for oil and gas reservoirs is thus directed to the identification of these product-bearing formations. The presence or absence of oil and gas in specific formations generally depends, of course, upon the geological history of the particular region of the earth. Significant hydrocarbon reservoirs not only require adequate porosity, permeability, and thickness on the part of the rock itself so that the formation can retain the hydrocarbon product, but also must have had a geologic history that involved the generation and migration of hydrocarbons from a source rock, as well as trapping, sealing and preservation of the hydrocarbons in the reservoir rock.

In North America, one type of geological formation that is well known to generally bear oil and gas is Morrow sandstone, also referred to as Morrow sand. Because of their geologic history, and also because of the permeability and porosity of the sandstone structure, Morrow sands typically contain hydrocarbon products in useful amounts. However, since Morrow sands in North America typically correspond to ancient river and stream beds, and as such are generally in the form of channels, bars, and other discontinuous sand bodies at varying depths in the earth, rather than strata of large area, it is difficult to find Morrow sands in typical seismic surveys. This difficulty in finding Morrow sands is exacerbated by the acoustic similarity of Morrow sands to neighboring limestones and shales. As such, seismic reflections from Morrow sands generally do not stand out from these neighboring structures in conventional seismic surveys, either in amplitude or in character.

By way of further background, a known technique useful in conventional seismic surveys is amplitude-versus-offset ("AVO") analysis. According to the AVO approach, information regarding a subsurface interface is obtained not only from the stacked normal-incidence amplitude of seismic energy, but also from the behavior of the detected seismic reflections as a function of the angle of incidence from the normal. Dependence of the reflected amplitude upon the angle of incidence is believed to be due to the transformation of incident pressure waves to reflected shear waves at certain interfaces, thus reducing the amplitude of reflected pressure waves, such transformation being angularly dependent. The extent to which pressure waves are transformed into shear waves, as a function of angle of incidence, is due to differences in acoustic impedance between the formations on either side of the reflective interface.

According to conventional AVO analysis, one considers the amplitude R of a reflected seismic wave from an interface (i.e., the "target horizon") as a function of the angle of incidence $\theta$ from the normal according to the following relationship:

$$R(\theta) = A + B \sin^2 \theta$$

In this case, A is the zero-offset response (also referred to as the AVO intercept), while B is the AVO slope or gradient since it is representative of the rate of change of amplitude with the square of the angle of incidence. A seismic trace, which is the time-dependent signal received at a geophone, may similarly be represented by a function $S(t,\theta)$ as follows:

$$S(t,\theta) = A(t) + B(t) \sin^2 \theta$$

Since AVO analysis is directed to determining the intercept and slope values at specific points in time along a trace (i.e., depth points), corresponding to a particular horizon, a conventional approach plots the A and B values at sampled times of the trace, thus eliminating the time-dependency from the analysis.

Theoretical values for A and B can be calculated for isolated rock interfaces (i.e., at specific horizons), through the use of the linearized Zoeppritz equations and based upon typical values for compressional velocity, density and Poisson's ratio for the strata on either side of the interface of interest, as described in Swan, "Properties of direct AVO hydrocarbon indicators", *Offset-dependent reflectivity—Theory and Practice of AVO analysis* (Castagna, J. P. & Backus, M. M., eds., Soc. Expl. Geophys., 1993), pp. 78–92. As described therein, variations in the A and B values for particular interfaces from the theoretical A-versus-B trend line for the expected stratigraphic sequences can indicate the location of interfaces in the survey.

It is therefore an object of the present invention to provide a method and system for analyzing conventional amplitude-versus-offset seismic survey data in such a way as to identify gas-bearing sandstone structures in the survey.

It is a further object of the present invention to provide such a method and system that can distinguish gas-bearing sands from neighboring limestones and shales.

It is a further object of the present invention to provide such a method and system that is particularly suitable for identification of Morrow sand geological structures.

It is a further object of the present invention to provide such a method and system that can operate upon conventional data using conventional computing equipment.

It is a further object of the present invention to provide such a method and system in which the reflection data taken by multiple detectors can be statistically normalized, so that coupling effects and other inaccuracies do not affect the analysis.

Other objects and advantages of the present invention will be apparent to those of ordinary skill in the art having reference to the following specification together with the drawings.

SUMMARY OF THE INVENTION

The invention may be implemented into a computer system for analyzing seismic survey data, where the seismic survey includes multiple reflection readings for a given depth point, at multiple angles from the normal. In the case of land-based surveys, the reflection data is preferably normalized among the multiple detectors, to eliminate variations in geophone coupling to the earth from the analysis. Amplitude-versus-offset (AVO) processing is then performed to provide an intercept-versus-slope trend line over the survey region, based upon which a determination of the difference between the actual slope and the trend line may be determined for each survey analysis point. Those survey points at which the intercept-versus-slope point is located in the second and fourth quadrants (i.e., $\Delta$ slope being opposite in polarity from its intercept) indicate interfaces of Morrow sand formations.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 2b is a plot of deviation of the AVO slope from the trend line of FIG. 2a versus zero-offset amplitude for the formations plotted in FIG. 2a.

FIG. 9 is an example of the color display output of a selected line in a typical survey, generated by a method according to the preferred embodiment of the invention.

DETAILED DESCRIPTION OF THE PREFERRED EMBODIMENT

Figure 1:
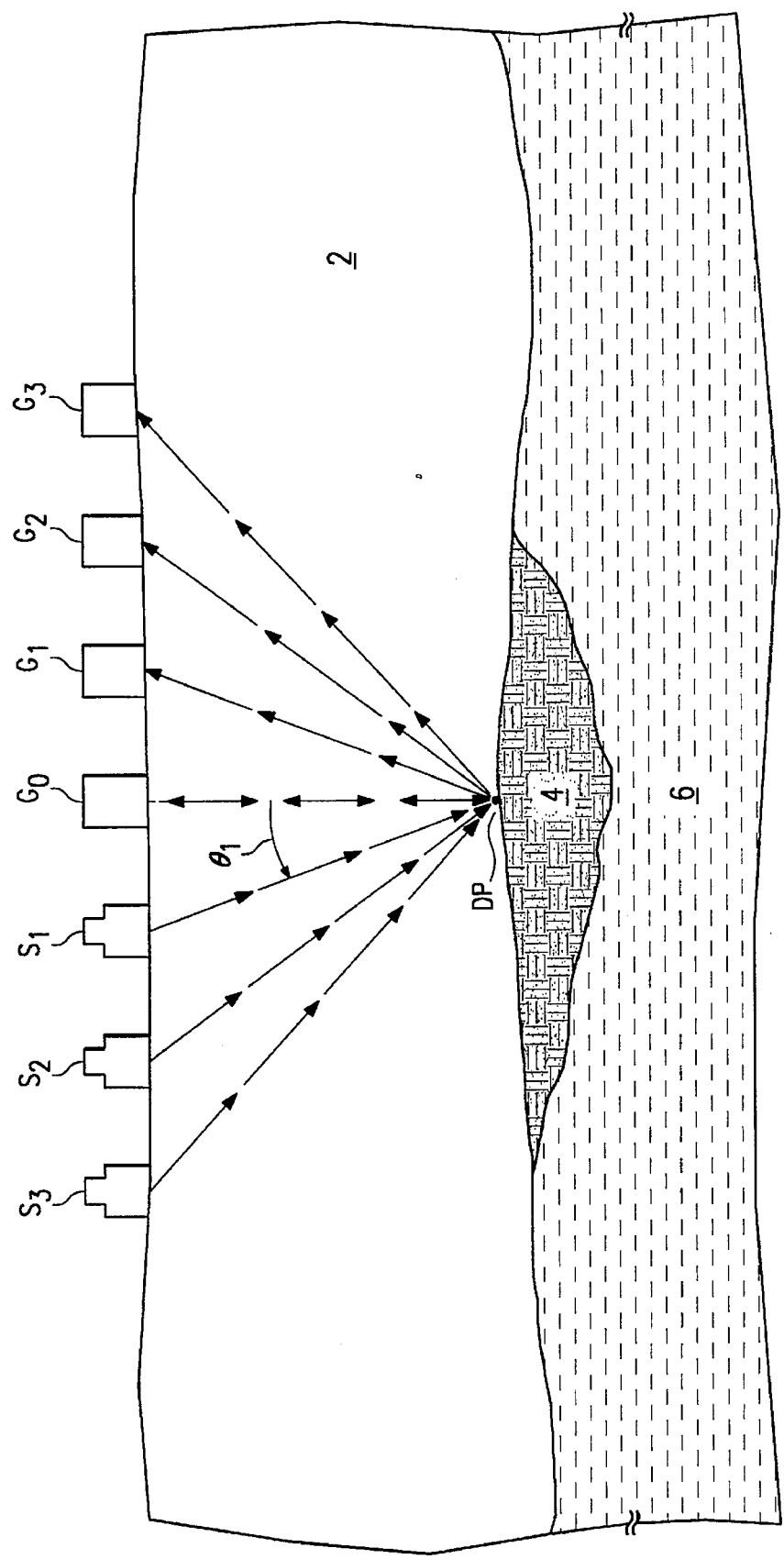
FIG. 1 is a cross-sectional view of a portion of the earth illustrating a single depth point in a seismic survey from which multiple seismic waves are reflected.

Referring first to FIG. 1, an amplitude-versus-offset (AVO) survey with which the preferred embodiment of the invention is useful will first be described, relative to a land-based survey containing a single depth point DP at a horizon between formations 2, 4. While the survey of FIG. 1 is a land-based survey, it will of course be appreciated that the present invention is also applicable to marine surveys. Of course, the example of FIG. 1 will be repeated for a multitude of depth points DP to provide a seismic survey of either the two-dimensional or three-dimensional (2-D or 3-D) type; further, each depth point DP will have a corresponding time trace indicative of reflections received over varying time in the seismic survey. In the example of FIG. 1, depth point DP corresponds to the top surface of Morrow sand formation 4. Morrow sand 4 is located between formations 2, 6, and as is evident from the cross-section of FIG. 1, has a limited width, as Morrow sands typically correspond to ancient creek beds.

As is evident from FIG. 1, depth point DP in a seismic survey will reflect seismic energy along multiple paths, at varying angles. A zero-offset reflection is indicated by geophone $G_0$, which lies directly vertically above depth point DP. Seismic energy imparted by source $S_1$ is also reflected from depth point DP and reflected to geophone $G_1$; the angle of incidence $\theta_1$ is the angle of the path of energy from source $S_1$ from the vertical (i.e., from the zero-offset path). Similarly, energy imparted by sources $S_2$, $S_3$ is reflected from depth point DP and received at geophones $G_2$, $G_3$, at increasing angles of incidence $\theta$ from the normal. As will become apparent from the following description, the amplitude of the imparted seismic energy will vary with variations in the angle of incidence $\theta$.

According to conventional AVO analysis, the relative amplitude of the reflected energy to the imparted energy at zero offset (i.e., the vertical path under geophone $G_0$) is referred to as the AVO intercept A for depth point DP. The AVO intercept value A may be either positive or negative, and will be between −1 and 1. For typical real geological interfaces and for relatively small angles, the amplitude of reflected to imparted energy will vary with approximately the sine squared of the angle $\theta$ in a linear fashion (i.e., with a constant slope, referred to as the AVO slope B). As such, in conventional AVO analysis, depth point DP at a specific horizon will have a single A value and a single B value, according to the relationship:

$$R(\theta)=A+B\sin^2\theta$$

Alternative models used in conventional AVO analysis may be used in connection with the present invention. For example, the reflected energy may be expressed as the following:

$$R(\theta)=A\cos^2\theta+B\sin^2\theta$$

In either case, the first and second coefficient values A, B, respectively, for depth point DP at the interface shown in FIG. 1, will depend upon the relative elastic properties of formations 24. According to the preferred embodiment of the invention, the model $R(\theta)=A+B\sin^2\theta$ is used, as will be described hereinbelow.

Figure 2A:
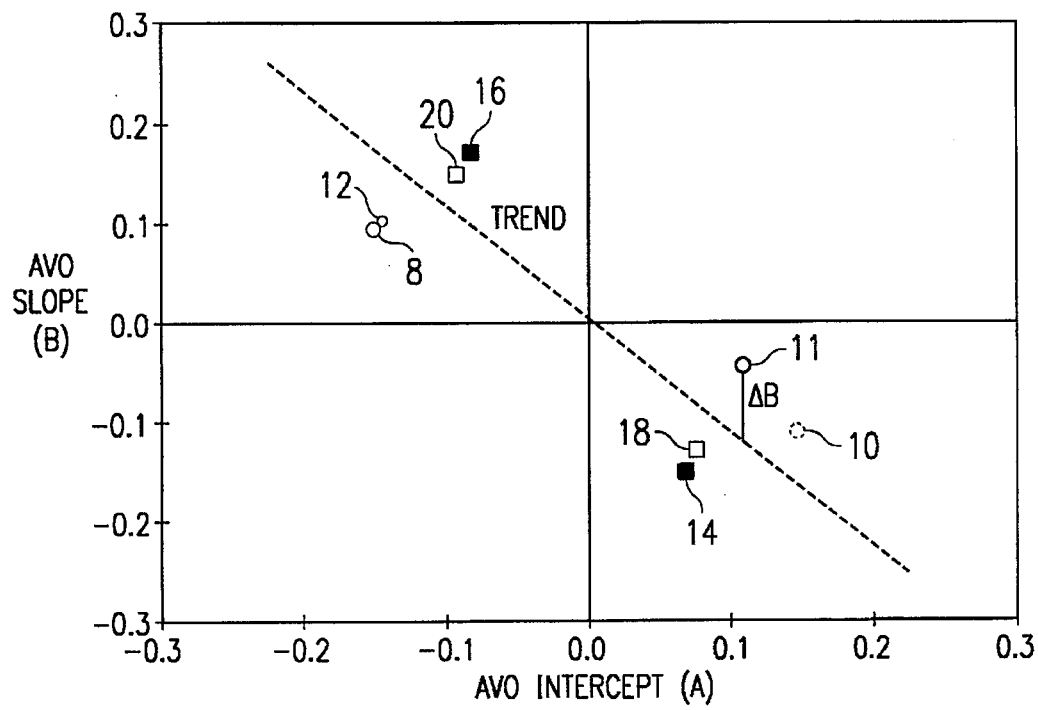
FIG. 2a is a plot of AVO slope versus zero-offset amplitude, as shown for various geological formations.

Referring now to FIG. 2a, a typical plot of AVO amplitude versus AVO slope for depth points in a survey are illustrated. The plot of FIG. 2a illustrates the locus of a plurality of depth points (not shown) from an actual survey in A–B space; in other words, FIG. 2a is a plot of the AVO intercept value A (i.e., the response at $\theta=0°$) versus the AVO slope value B (i.e., the rate of change at which the detected reflected amplitude changes as a function of the sine squared of the angle), for a number of depth points in time of a seismic survey along a trace. The plot of FIG. 2a thus corresponds to a series of points at interfaces along a vertical path, and also shows a trend line based upon the A–B relationship for all points along the path.

Point 8 in FIG. 2a corresponds to a horizon interface at the bottom of a Strawn limestone formation and the top of an Atoka shale formation, while point 12 corresponds to a horizon at the bottom of a Morrow limestone formation and the top of a Morrow shale formation; each of points 8 and 12 have a slope B that is below the trend line and have negative AVO intercept values A. Point 10, having a slope B that is above the trend line and a positive intercept A value, corresponds to a horizon at the bottom of a Barnett shale formation and the top of a Chester lime formation, while point 11 (also having a slope B that is above the trend line and a positive intercept A value) corresponds to a horizon at the bottom of an Atoka shale formation and the top of a Morrow sand formation. Point 14 corresponds to a horizon interface at the bottom of a Morrow shale formation and the top of a gas-bearing Morrow sand, and point 18 corresponds to a horizon at the bottom of a Morrow shale formation and the top of a water-bearing Morrow sand; each of points 14, 18, corresponding to the top of a Morrow sand, has a slope B that is below the trend line and a positive intercept A.

Point 16 corresponds to the horizon at the bottom of a gas-bearing Morrow sand and the top of a Barnett shale formation, and point 20 corresponds to the horizon at the bottom of a water-bearing Morrow sand and the top of a Barnett shale; points 16, 18, each corresponding to the bottom of a Morrow sand, have slopes B above the trend line along with negative intercepts A.

Figure 2B:
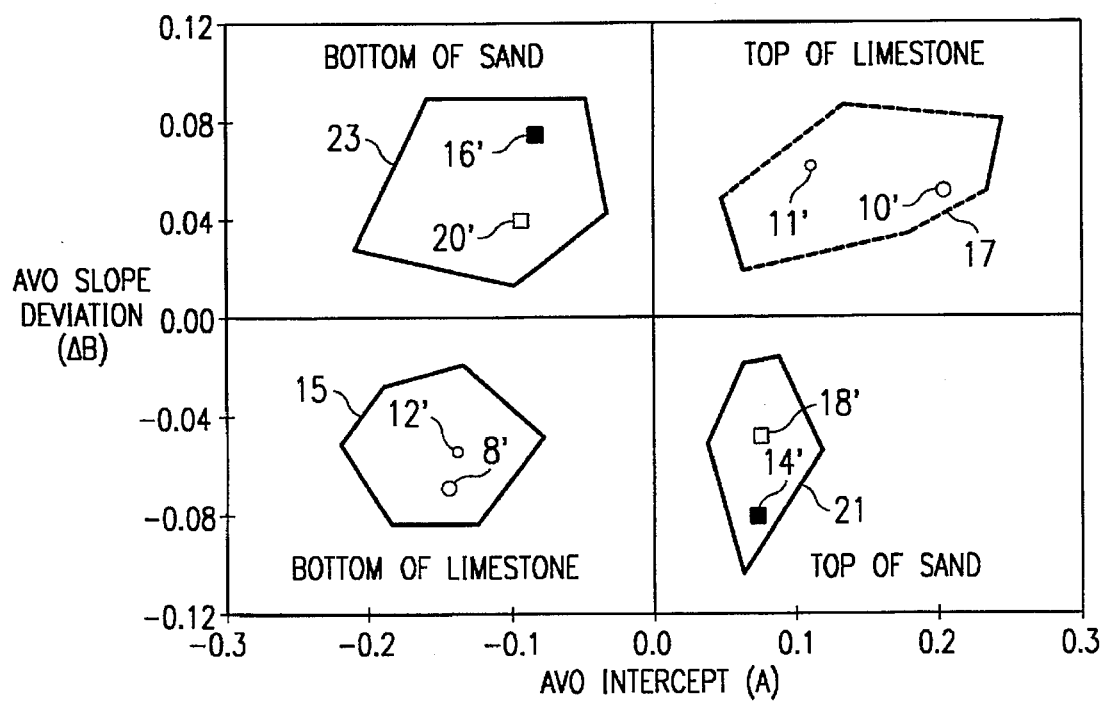

It has been discovered, according to the present invention, that Morrow sands may be distinguished from limestones by looking to the polarity of the difference in the AVO slope B from the overall trend line for each point, in combination with the polarity of the AVO intercept A. FIG. 2$b$ illustrates the points of FIG. 2$a$ as plotted in A–$\Delta$B space; in other words, the horizontal axis in the plot of FIG. 2$b$ is the AVO intercept A and the vertical axis corresponds to the deviation of the AVO slope B from the trend line (i.e., $\Delta$B). Each of the points in FIG. 2$a$ are replotted in FIG. 2$b$, and indicated by a prime (i.e., point 8' of FIG. 2$b$ corresponds to point 8 in FIG. 2$a$).

The present invention is based on the discovery that the quadrants of the plot of FIG. 2$b$ in A–$\Delta$B space distinguish AVO survey points corresponding to Morrow sand interfaces from limestone interfaces. For the example of FIG. 2$b$, points 8', 12', each of which correspond to the bottom of limestone formations, in the –A, –$\Delta$B quadrant of A–$\Delta$B space. The +A, +$\Delta$B quadrant contains points 10', 11', which correspond to tops of limestone formations. Points 14', 18' corresponding to the tops of Morrow sand formations are located in the +A, –$\Delta$B quadrant, while points 16', 20' corresponding to the bottom of Morrow sand formations are located in the –A, +$\Delta$B quadrant of the plot. Indeed, polygons 15, 17, 21, 23 have been derived in A–$\Delta$B space to circumscribe paired values of A, $\Delta$B that indicate the tops and bottoms of the limestone and Morrow sand formations. For example, any A–$\Delta$B survey point falling within polygon 21 is likely to indicate the top of a Morrow sand formation, and an A–$\Delta$B survey point falling within polygon 23 is likely to indicate the bottom of a Morrow sand. This behavior of Morrow sand formations, relative to limestones and shales, is believed to be due to differences in Poisson's ratio between sands, on the one hand, and limestone and shale structures, on the other hand. These differences, while not reflected in other seismic analysis methods, have been discovered to be readily apparent according to the AVO method of the preferred embodiment of the invention. As will be described in further detail hereinbelow, the preferred embodiment of the invention provides a system and method of analyzing AVO data in such a manner as to take advantage of the behavior exhibited in FIGS. 2$a$, 2$b$, and thus to distinguish Morrow sand formations from formations, such as limestone, from which Morrow sands heretofore have been indistinguishable according to conventional seismic analysis.

Figure 3:
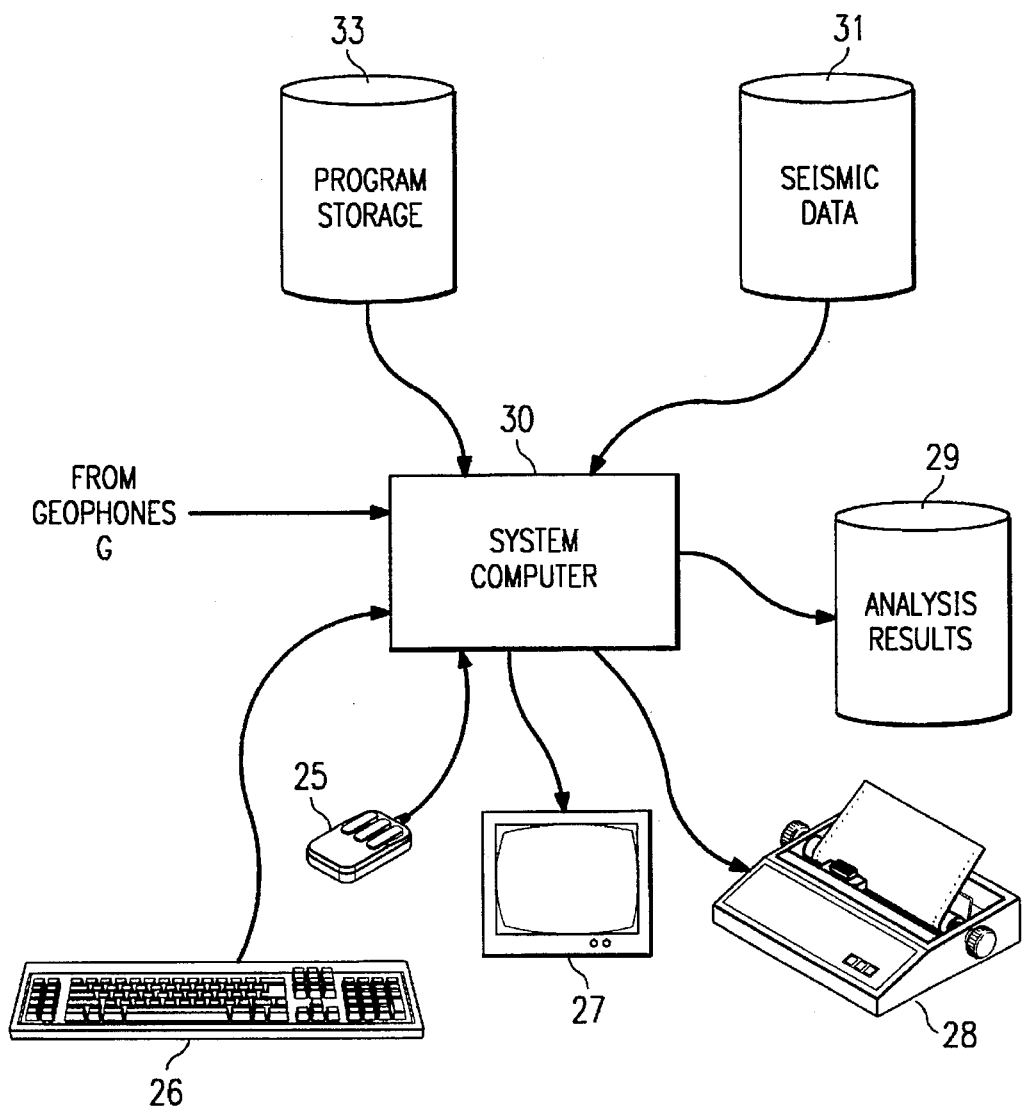
FIG. 3 is an electrical diagram, in block form, of a computer system for performing the preferred embodiment of the invention.

Referring now to FIG. 3, a computer system into which the preferred embodiment of the invention may be implemented, will be described. This system includes system computer 30, which may be implemented as any conventional personal computer or workstation, preferably a UNIX-based workstation such as a SPARCstation available from Sun Microsystems, Inc., implemented either in standalone fashion, or as part of a network arrangement. System computer 30 is in communication with disk storage devices 29, 31, and 33, which are preferably external hard disk storage devices in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, seismic data from geophones G is stored on disk storage device 31, from which system computer 30 may retrieve the appropriate data to perform the analysis described hereinbelow, according to program instructions that correspond to the method described hereinbelow. For operation on system computer 30, the program instructions are written in the form of a computer program (e.g., in the C++ language or any other suitable language) stored in computer-readable memory, such as program disk storage device 33 of FIG. 3; of course, the memory medium storing the computer program may be of any conventional type used for the storage of computer programs, including hard disk drives, floppy disks, CD-ROM disks, magnetic tape, and the like.

According to the preferred embodiment of the invention, system computer 30 presents output primarily onto graphics display 27, or alternatively via printer 28; further in the alternative, system computer 30 may store the results of the analysis described hereinbelow on disk storage 29, for later use and further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 may either be located at a data center remote from the survey region, or alternatively may be located on site at the seismic survey to provide real-time analysis of the seismic survey as it is being taken.

In the example of a land-based survey, as shown in FIG. 1, system computer 30 is in communication with geophones G (either directly or via a recording unit, not shown), to receive signals indicative of the reflected seismic energy received thereat in the survey. These signals, after conventional formatting and other initial processing, are stored by system computer as digital data in disk storage 31 for subsequent retrieval and processing in the manner described hereinbelow. While FIG. 3 illustrates disk storage 31 as directly connected to system computer 30, it is also contemplated that disk storage device 31 may be accessible through a local area network or by remote access. Furthermore, while disk storage devices 29, 31 are illustrated as separate devices for storing input seismic data and analysis results, respectively, disk storage devices 29, 31 may of course be implemented within a single disk drive (either together with or separately from program disk storage device 33), or in any other conventional manner as will be fully understood by one of skill in the art having reference to this specification.

Figure 4:
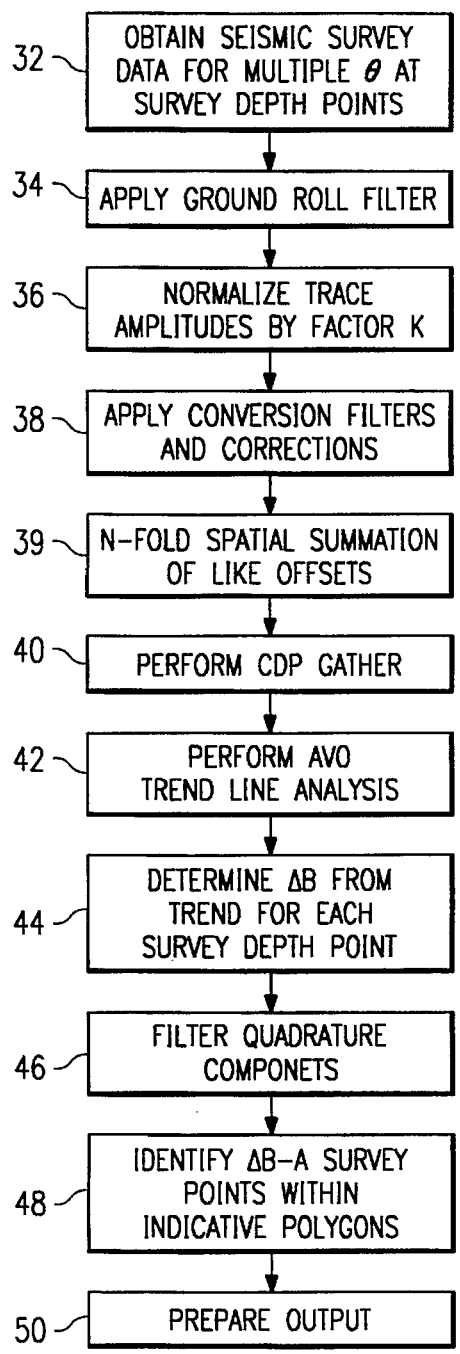
FIG. 4 is a flow chart illustrating a method of detecting Morrow sands in an AVO seismic survey according to the preferred embodiment of the invention.

Referring now to FIG. 4, a method of identifying Morrow sands from seismic data according to the preferred embodiment of the invention will now be described. As noted above, while the distinctive attributes of Morrow sands are identifiable according to the present invention, it is contemplated that the present invention will be applicable in the identification of similar formations elsewhere in the world, and as such is not limited to the detection of Morrow sand formations as commonly encountered in North America.

The method of the preferred embodiment of the invention begins, in process 32, with the obtaining of seismic data for a survey region having the desired attributes. For example, process 32 may be performed by obtaining a seismic survey over the region of interest, by conventional techniques, such that each depth point of interest in the survey has seismic data corresponding to multiple offsets and thus multiple angles of incidence. The maximum angle of incidence that will provide useful data for the preferred embodiment of the invention is contemplated to be around 40° from the normal, and the maximum frequency of the seismic energy should be at least 85 Hz to provide useful seismic resolution. The seismic data obtained in process 32 preferably has all shot and receiver gathers cross-correlated with one another, such that a consistent statics solution may be obtained. The seismic data obtained in process 32 may come from either a newly performed survey or, alternatively, may use data from existing surveys that meet the above requirements. Referring to FIG. 4, process 82 is completed by system computer 30 storing the obtained seismic data in disk storage 31 for later retrieval.

Process 34 is next performed, in which system computer 30 performs ground roll filtering upon the seismic data that was obtained and stored in disk storage 31 in process 32. The ground roll filtering performed in process 34 is preferably done by the application of a conventional 3D fan filter; preferably, this fan filter should take into account the irregular 3D geometry with which the seismic data are collected. Such filtering is readily performed by system computer 30, according to conventional digital filtering techniques. As a result of process 34, ground roll noise in the originally obtained seismic data is attenuated.

Process 36 is next performed by system computer 30, to normalize the individual traces in the seismic survey. This normalization of amplitudes of the seismic signals is highly desirable, especially in land-based surveys, so that variations in coupling to the earth and in near-surface properties among the various geophones G may be eliminated from the seismic data to be analyzed according to the preferred embodiment of the invention. Heretofore, conventional amplitude-versus-offset (AVO) analysis has not utilized such normalization of the traces in the seismic survey, because normalization would destroy the amplitude variations with angle of incidence that is sought by such conventional AVO methods. Instead, the entire contribution of each suspect trace is eliminated from analysis in conventional AVO methods.

However, as discussed hereinabove, according to the preferred embodiment of the invention, the important factor in the AVO analysis is not the absolute amplitude variation with angle (i.e., the absolute slope or gradient B), but is instead the slope deviation ΔB (i.e., the slope B at each depth point relative to the slope B for other depth points in the survey). In other words, the preferred embodiment of the invention analyzes the extent to which a seismic event increases or decreases faster or slower than the average for the survey; the normalization of process 36 thus only sets the average rate of change to zero. As such, normalization of the amplitudes among traces in the survey region will not only eliminate the effects of poor coupling and near-surface variations, but may also allow the use of traces which would have been unusable in conventional AVO analysis.

In process 36, normalization is performed by system computer 30 by the application of a normalization factor $K_i$ to each trace $T_i(t)$, determined by:

$$K_i = \left[ \int_{t_2}^{t_1} |T_i(t)|^p dt \right]^{-p^{-1}}$$

Time window $t_1$ to $t_2$ is the time window of the trace over which the normalization is to be performed, and thus is the time of interest for the AVO analysis. The exponent p is selected according to the type of normalization desired. Root-mean-square normalization is obtained by using p=2, while absolute amplitude normalization results from p=1. The resulting normalization thus, as noted above, eliminates sources of variation from the seismic data under analysis.

Following the normalization of process 36, system computer 30 then performs conventional seismic processing filtering and correction in process 38, to the extent desired by the analyst. These conventional procedures include, for the case of the 3-D survey, solution of 3-D refraction statics, attenuation of 3-D linear noise, application of 3-D surface-consistent statics, 3-D dip moveout, 3-D prestack time migration, and the like. For either 2-D or 3-D surveys, process 38 may include radon transform multiples rejection, surface-consistent deconvolution, automated trace editing, zero phase tie of the seismic data to well control, and normal moveout correction. It is contemplated that one of skill in the art will be readily able to apply the desired filters and corrections indicated by process 38 of FIG. 4.

Despite the operation of process 38, it has been discovered that signal-to-noise ratio for the normalized seismic data may not be adequate to provide useful data for the AVO analysis according to the preferred embodiment of the invention. As such, according to the preferred embodiment of the invention, system computer 30 performs process 39, in which spatial summation of multiple points in each trace surrounding the trace point is performed, to further improve the signal-to-noise ratio. Such spatial summing is known in the field of 3-D seismic survey processing, but is not believed to have been applied to seismic data for which AVO analysis is to be performed, as in the preferred embodiment of the invention.

Specifically, process 39 identifies, for each trace of interest, all traces having similar offsets for common depth points in an N×N grid (e.g., a five-by-five grid) surrounding the location corresponding to the trace of interest. System computer 30 then sums these identified traces of similar offset, and stores the sum as representative of the trace of interest; the raw trace is also retained, for use in summations for adjacent traces in a similar manner. This process is repeated for each trace of interest in the survey region. As a result of this spatial summing, an N-fold improvement in signal-to-noise ratio is obtained, with only an N-fold reduction in spatial resolution (which, for many 3-D surveys, is not of large consequence). In the case of a 2-D survey, an $N^2$-fold improvement in signal-to-noise ratio may be obtained by a similar process.

Figure 5B:
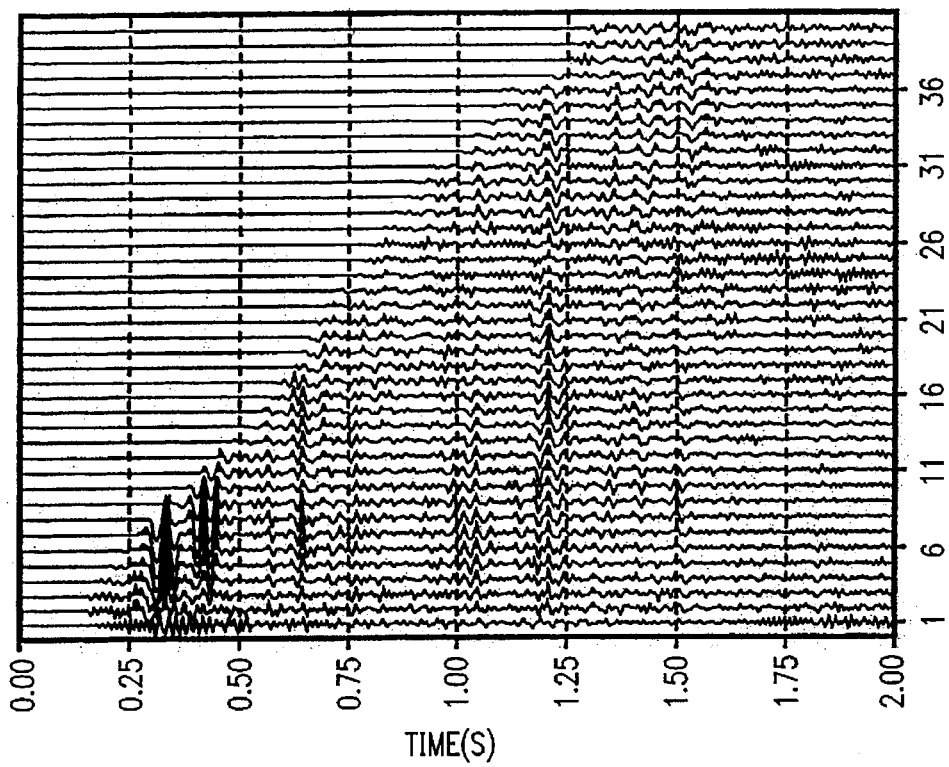
FIGS. 5a and 5b are series of traces from an exemplary survey before and after spatial summation, according to the preferred embodiment of the invention.
Figure 5A:
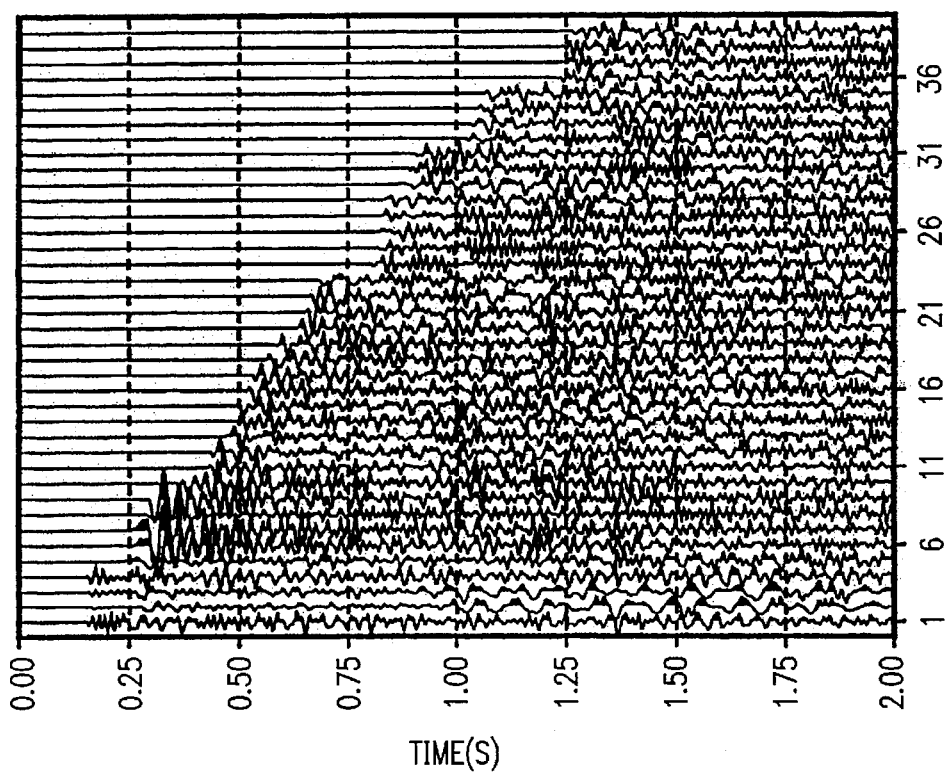

FIGS. 5a and 5b illustrate the effects of process 40 upon a set of traces for a typical seismic survey. FIG. 5a illustrates a series of traces from a survey prior to process 40 (i.e., after having been processed according to processes 32 through 38 described hereinabove), while FIG. 5b illustrates the traces after a 5×5 spatial summation performed by system computer 30. As is evident from comparison of FIGS. 5a and 5b, the signal-to-noise ratio is dramatically improved through the spatial summation process.

According to this preferred embodiment of the invention, processes 32 through 39 described hereinabove were performed upon retrieved seismic survey data in the shot-point gather domain. As shown in FIG. 4, process 40 next performs a common depth point (CDP) gather of the traces after process 39. While processes 38, 39, 40 are shown in FIG. 4 as being in a specific order, it is of course to be understood that the specific order in which these processes are performed is not of particular importance, so long as processes 38, 39, if performed following CDP gather process 40, contemplate operation in the CDP gather domain, rather than in the shot-point gather domain.

Figure 6:
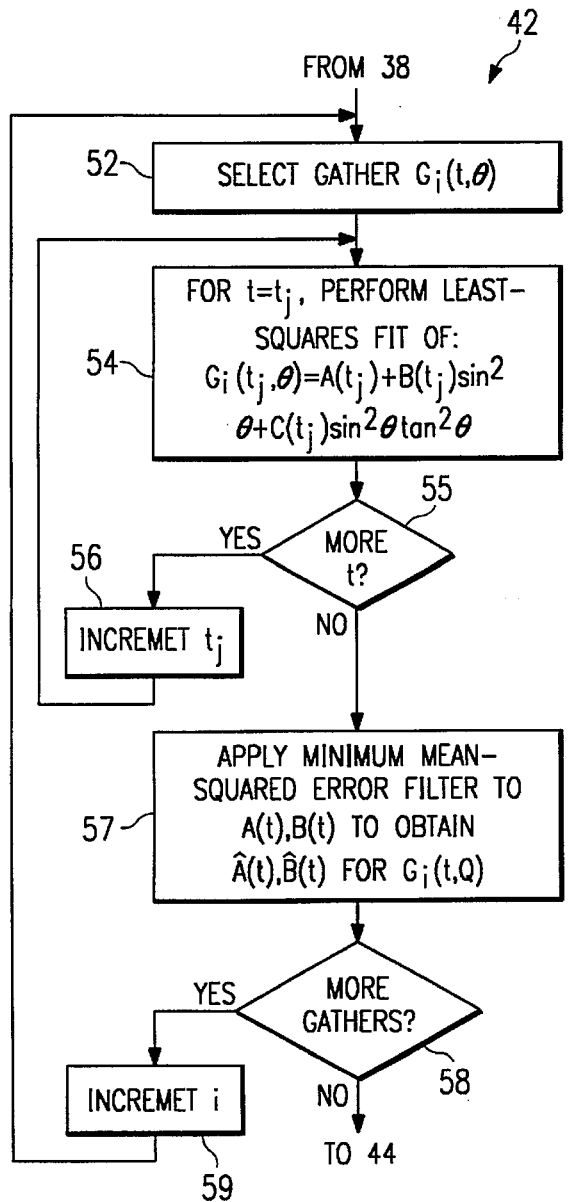
FIG. 6 is a flow chart illustrating the step of AVO trend line analysis according to the preferred embodiment of the invention.

Amplitude-versus-offset (AVO) process 42 is then performed by system computer 30 upon the results of process 40, to derive a trend line of intercept versus slope over the survey region. Process 42 is preferably performed in a manner that eliminates the effects of offset-dependent tuning which is often present in areas that contain hard-rock (or indurated) formations (which, in North America, correspond to areas in which Morrow sands may be present). Referring now to FIG. 6, the steps in process 42 according to the preferred embodiment of the invention will now be described in detail.

AVO analysis process 42 begins, in process 52, with the selection of a first gather $G_i$ $(t,\theta)$ for analysis. As will be evident from the following description, the process will be repeated for each of the CDP gathers $G(t,\theta)$ of interest in the survey. As will also be evident, according to this exemplary process, an AVO intercept value A and an AVO slope value B will be determined for each of the depth points of interest represented at individual times $t_j$ along gather $G_i$.

Upon selection of a gather $G_i$, system computer 30 performs process 54 to determine a first estimate of the AVO intercept value A and AVO slope B at a time $t_j$. As noted above, the AVO intercept value A is the zero-offset response of the formation corresponding to the selected time $t_j$. The exact representation of the AVO slope B is defined as follows:

$$B(t) = \lim_{\theta \to 0} \frac{1}{2\theta} \frac{\partial S(t,\theta)}{\partial \theta}$$

According to this embodiment of the present invention, process 54 is performed by system computer 30 by way of a least-squares fit of A and B for gather $G_i$ at time $t_j$, considering the seismic data corresponding to each of the multiple offsets, or incidence angle $\theta$, according to a particular model. Accordingly, process 54 effectively "stacks" the records from the multiple offsets to form a composite record; for gather $G_i$ in this example, the resultant composite record from process 54 will thus be referred to as stack $S_i$. If desired, the model for process 54 may be the simple two-term model:

$$R(\theta) = A + B \sin^2 \theta$$

As noted above, other conventional or alternative models used in amplitude-versus-offset analysis, such as the two-term model $R(\theta) = A\cos^2\theta + B\sin^2\theta$, may be used in connection with, and benefit from, the present invention; in the case of the $R(\theta) = A\cos^2\theta + B\sin^2\theta$ model, the first and second coefficients A and B would be estimated in process 54.

In any case, offset-dependent tuning has been observed to be an especially severe problem in many areas in which the desired Morrow sands are located, such as in the Permian basin of North America. It has been found that offset-dependent timing may be eliminated to a large degree by inclusion of a third term in the least-squares model for process 54, where the third term is a function of incidence angle $\theta$ where the following limit is finite:

$$\lim_{\theta \to 0} \frac{f^{(iv)}(\theta)}{\theta}$$

According to the preferred embodiment of the invention, the model used in process 54 to estimate the AVO intercept value A and AVO intercept slope B for a stack Si is as follows:

$$S_i(t_j,\theta) = A(t_j) + B(t_j)\sin^2\theta + C(t_j)\sin^2\theta \tan^2\theta$$

The third term, $C(t_j)\sin^2\theta\tan^2\theta$, has been observed to improve the accuracy of the estimated AVO slope B to the true defined AVO gradient B, as compared to the simpler two-term model noted above, especially where offset-dependent tuning effects are severe. Process 54 thus provides sample the $t_j$ in stack $S_i$ with an estimated AVO intercept value A and an estimated AVO slope value B.

Decision 55 then determines whether additional sample times remain to be analyzed in gather $G_i$ to produce stack $S_i$ and, if so, transfers control to process 56 in which the sample time is incremented to the next time $t_j$ prior to repeating process 54. If all of the desired sample times $t_j$ have undergone process 54, control passes to process 57, where filtering of normal moveout (NMO) stretch errors in the AVO slope value B for stack $S_i$.

According to the preferred embodiment of the invention, system computer 30 performs a filtering operation in process 57 by applying a mean-squared error filter to the estimated values of A, B for each sample time in stack $S_i$. As described in U.S. Pat. No. 5,258,960, issued Nov. 2, 1993, assigned to Atlantic Richfield Company and incorporated herein by this reference, conventional NMO corrections introduce a predictable error in the AVO slope values B, due to the well-known NMO "stretch" effects on seismic response with increasing offset. The predictable nature of the error in AVO slope values due to NMO stretch are thus removed in process 57, preferably in the manner described in the above-incorporated U.S. Pat. No. 5,258,960 as will now be briefly described.

According to the preferred embodiment of the invention, process 57 is performed by system computer 30 first developing a pair of filter functions $h_1(t)$ and $h_2(t)$ which are based upon an estimate of the input seismic wavelet w(t), for example a Ricker wavelet of the appropriate center frequency. These filter functions are to produce estimates $\hat{A}(t)$, $\hat{B}(t)$ of the AVO intercept and AVO slope, respectively, such estimates being optimized in the minimum mean-squared error sense, according to the following:

$$\hat{A}(t) = [A_t(t)] * h_1(t)$$

$$\hat{B}(t) = [B_t(t) + n(t)] * h_1(t) + \tfrac{1}{2} D(t)[A_t(t) + n(t)] * h_2(t)$$

where n(t) corresponds to noise in the stacked traces such that $A_t(t)$ and $B_t(t)$ are the true intercept and gradient, and where D(t) is a factor affected by the rate at which the stacking velocity $V_s$ changes with time as follows:

$$D(t) = 1 + \frac{2 t V_s'(t)}{V_s(t)}$$

The second term in the above equation for $\hat{B}(t)$ (i.e., the term including the convolution with filter $h_2(t)$), corresponds to an estimate of the NMO stretch distortion.

Following normal equations for autocorrelation and crosscorrelation of the filter functions $h_1(t)$, $h_2(t)$, and assuming that the hue intercept and slope functions $A_t(t)$ and $B_t(t)$ are uncorrelated with the noise function n(t), filter functions $h_1(t)$, $h_2(t)$ will satisfy the following correlations:

$$h_1(t) * [\Phi_d(t) + \Phi_n(t)] = \Phi_d(t)$$

$$h_2(t) * [\Phi_d(t) + \Phi_n(t)] = \Phi_c(t)$$

where $\Phi_d$ is the autocorrelation of the noise-free intercept trace, $\Phi_n$ is the autocorrelation of the AVO noises, and $\Phi_c$ is the cross correlation between the intercept trace and the NMO stretch error $B_s$. These correlations may be expressed as:

$$\Phi_c(t)=\Phi_w(t)*\Phi_s(t)$$

$$\Phi_c(t)=\Phi_x(t)*\Phi_s(t)$$

where $\Phi_w$ is the autocorrelation of the seismic wavelet w(t), $\Phi_x$ is the cross-correlation between w(t) and tw$^1$(t), and where $\Phi_s$, is the autocorrelation of the underlying reflection coefficients. Solving these equations in the frequency domain provides frequency domain representations $H_1(\omega)$, $H_2(\omega)$ of time domain filter functions $h_1(t)$, $h_2(t)$, respectively, as follows:

$$H_1(\omega) = \frac{S_s(\omega)|W(\omega)|^2}{S_s(\omega)|W(\omega)|^2 + S_n(\omega)}$$

$$H_2(\omega) = H_1(\omega)\left[1 + \frac{\omega W'(\omega)}{W(\omega)}\right]$$

where $S_n(\omega)$ is the power spectrum of the noise, where $S_s(\omega)$ is the power spectrum of the reflection ensemble, and where $W(\omega)$ is the Fourier transform of the input seismic wavelet w(t). Where the input seismic wavelet w(t) is a Ricker wavelet of center frequency $w_o$, w(t) may be expressed as follows:

$$w(t) = \left(1 - \frac{1}{2}\omega_0^2 t^2\right) e^{\frac{-\omega_0^2 t^2}{4}}$$

This results in correlation functions that may be explicitly evaluated from the following:

$$\Phi_w(t) = K\left[\frac{1}{48}(\omega_0 t)^4 - \frac{1}{2}(\omega_0 t)^2 + 1\right] e^{-\frac{(\omega_0 t)^2}{8}}$$

$$\Phi_x(t) = K\left[\frac{1}{384}(\omega_0 t)^6 - \frac{3}{32}(\omega_0 t)^4 + \frac{3}{8}(\omega_0 t)^2 + 2\right] e^{-\frac{(\omega_0 t)^2}{8}}$$

where:

$$K = 3\frac{\sqrt{\frac{\pi}{2}}}{\omega_0}$$

Given the above derivation, it is contemplated that finite length time-domain filters $h_1(t)$, $h_2(t)$ may be readily solved from the above equations with a Levinson inversion in the manner described in Linville, "Single-channel digital filter design for seismic applications", Geophysics, 59 (1994), pp. 1584–1592. Upon derivation of these time-domain filters, system computer 30 can, in process 57, digitally apply $h_1(t)$, $h_2(t)$ to the A(t), B(t) estimates from process 54 to derive the estimated values of AVO intercept Â(t) and AVO slope B̂(t) for stack $S_i(t)$, correcting for the effects of NMO stretch. These estimates for AVO intercept Â(t) and AVO slope B̂(t) for stack $S_i(t)$ are then stored in memory.

Alternatively to the process 57 described hereinabove, the filtering may apply the technique described in U.S. Pat. No. 4,995,007, incorporated herein by this reference. However, this filtering technique may, in some circumstances, result in noise amplification at high frequencies.

Following the filtering of process 57, decision 58 may then be performed in which system computer 30 determines if additional stacks S(t,θ) are to be analyzed. If so, index i is incremented (process 59), and the analysis is repeated beginning again from process 52.

If all stacks S have been analyzed, control passes to process 44 (FIG. 4), in which system computer 30 determines, for each depth point of interest (i.e., each sample time $t_j$) on each stack $S_i$ of interest, the slope deviation value ΔB. This slope deviation value ΔB is preferably determined by system computer 30 for each depth point in each stack in the manner which will now be described relative to FIG. 7. Process 44 preferably includes the AVO processing steps described in copending application Ser. No. 08/107,091, filed Aug. 16, 1993, assigned to Atlantic Richfield Company and incorporated herein by this reference.

Figure 7:
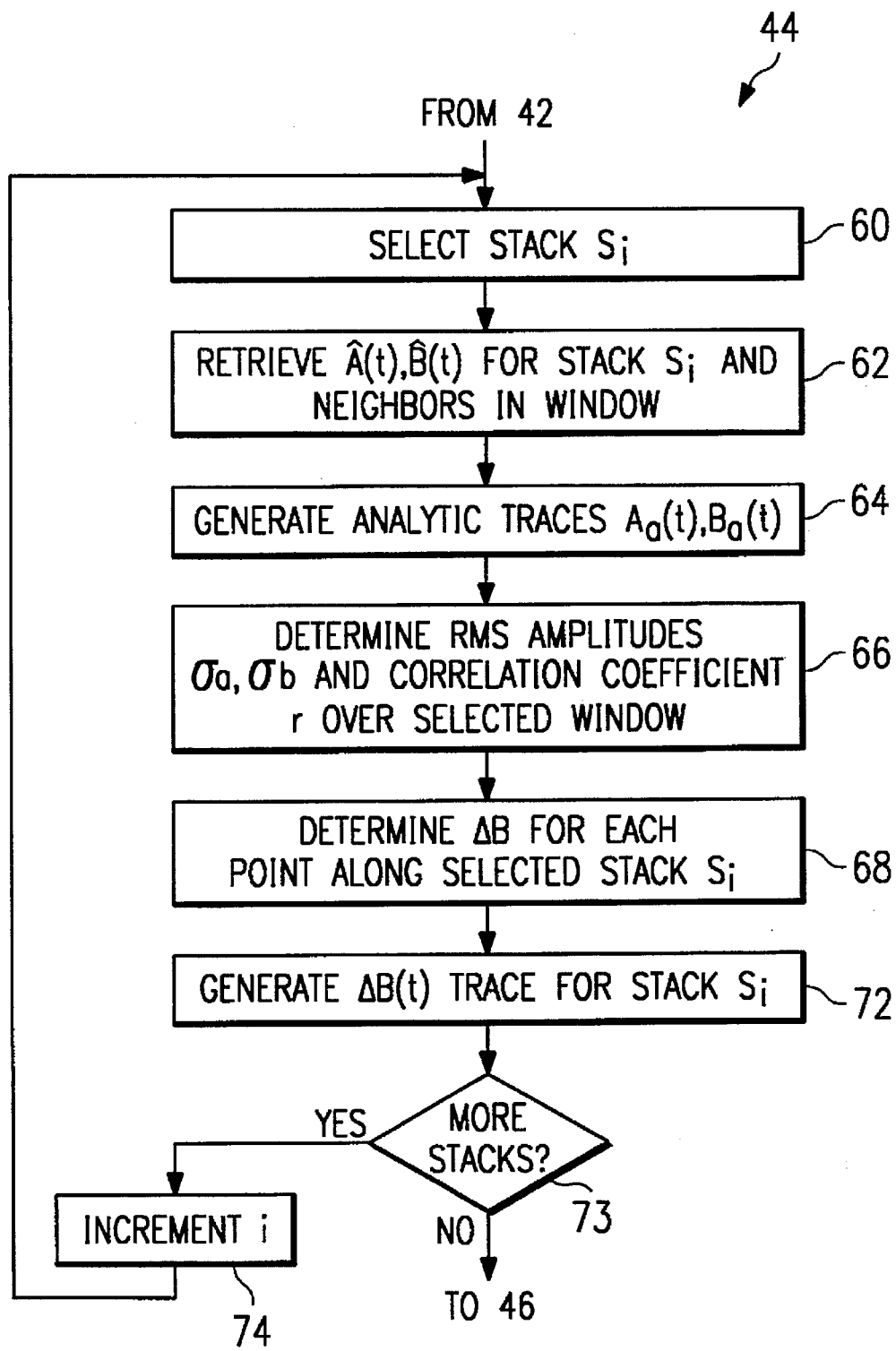
FIG. 7 is a flow chart illustrating the step of determining slope deviation traces according to the preferred embodiment of the invention.

As shown in FIG. 7, process 44 begins with selection of stack $S_i(t,\theta)$ to be analyzed, in process 60. System computer 30 then performs process 62 to retrieve from memory the estimated AVO intercept trace Â(t) and the estimated AVO slope trace B̂(t) for the selected stack $S_i(t)$ and also for certain neighboring stacks in a selected window over which the AVO processing will take place, as will be described hereinbelow and as described in the above-incorporated application Ser. No. 08/107,091.

Upon retrieval of the estimated intercept and slope traces in process 62, system computer 30 then generates, for selected stack $S_i(t)$, analytic or complex traces $A_a(t)$, $B_a(t)$ based upon the intercept and slope traces. As described in the above-incorporated copending application Ser. No. 08/107,091, process 62 derives analytic traces $A_a(t)$, $B_a(t)$ by adding the real trace (i.e., traces Â(t) and B̂(t), respectively) to the square root of −1 times its Hilbert transform. The generation of analytic traces $A_a(t)$, $B_a(t)$ is based upon the representation of seismic traces as the real part of the analytical or complex traces, as described in Taner, et al., "Complex Seismic Trace Analysis", Geophysics, Vol. 44, No. 6 (Jun. 1979), pp. 1041–63.

According to the method described in copending application Ser. No. 08/107,091, system computer 30 next determines, in process 66, several important statistical characteristics of analytic traces $A_a(t)$, $B_a(t)$, namely the root-mean-square (RMS) amplitudes $\sigma_a$, $\sigma_b$, respectively, and also the correlation coefficient r over the selected window. The RMS amplitudes $\sigma_a$, $\sigma_b$ are derived in process 66 according to the following equations:

$$\sigma_a = \frac{\sqrt{\sum_k w_k |A_k|^2}}{\sum_k w_k}$$

$$\sigma_b = \frac{\sqrt{\sum_k w_k |B_k|^2}}{\sum_k w_k}$$

where the index k refers to the $k^{th}$ sample within the correlation window, where $|A_k|$ and $|B_k|$ are the magnitudes of the $k^{th}$ sample of the analytic traces $A_a(t)$, $B_a(t)$, respectively, and where $w_k$ is a weighting factor for the $k^{th}$ sample within the correlation window determined as follows:

$$w_k = [|A_k|^2 + |B_k|^2]^{-Q}$$

where Q is a weighting exponent which governs the relative contribution, to the data statistics, of strong and weak seismic reflectors. While, in the preferred embodiment of the present invention, the preferred value of Q is ½, different geological conditions may dictate other values of this weighting exponent Q. System computer 30 also determines a correlation coefficient r in process 66, according to the following relationship:

$$r = \frac{1}{\sigma_a \sigma_b} \frac{\sum_k w_k A_k B_k^*}{\sum_k w_k}$$

where $B_k^*$ is the complex conjugate of the $k^{th}$ sample of the B trace.

In process 68, system computer 30 next computes the estimated slope deviation ΔB from the analytic traces $A_a(t)$, $B_a(t)$ in the manner described in the above-incorporated copending application Ser. No. 08/107,091. As described therein, desired statistics $\sigma_a^d$, $\sigma_b^d$ and $r_d$ are selected based upon intuitive assumptions regarding the portion of the earth being surveyed. A similar procedure may also be used according to the present invention to calculate the slope deviation ΔB. According to the preferred embodiment of the invention, in which survey data in regions possibly containing Morrow sands is being analyzed, desired correlation coefficient $r_d$ is selected to equal zero, to ensure that the ΔB estimated are uncorrelated from the zero-offset reflection coefficient estimates A. The desired RMS amplitude statistics $\sigma_a^d$, $\sigma_b^d$ are selected to match $\sigma_a$, $\sigma_b$, respectively. Based on these desired statistics, modified AVO intercept traces $A_m(t)$ and AVO slope trace $B_m(t)$ may be generated as follows (for the case where $r^d = 0$):

$$A_m(t) = \frac{\sigma_a^d}{\sigma_a} A_a(t)$$

$$\Delta B(t) = \sigma_b^d \left( \frac{B_a(t)}{\sigma_b} - r^* \frac{A}{\sigma_a} \right) \sqrt{\frac{1}{1 - |r|^2}} =$$

$$\left[ B_a(t) - r^* \frac{\sigma_b}{\sigma_a} A \right] \sqrt{\frac{1}{1 - |r|^2}}$$

Since $\sigma_a^d = \sigma_a$, then $A_m(t) = A_a(t)$. This operation effectively performs a regression on the A-B data, and computes the vertical deviation ΔB from the regression line. System computer 30 then stores, for each depth point, the complex slope deviation value ΔB produced in process 72, in the form of a ΔB(t) trace corresponding to stack $S_i(t)$.

Following the performance of process 72 for each of the depth points of the selected stack $S_i(t)$, decision 73 is performed to determine if additional stacks S(t) remain to be analyzed; if so, the index i is incremented (process 74) and control returns to process 60 to repeat the steps of process 44 for the next CDP stack in the survey. Upon completion of process 44 for all CDP stacks of interest, control passes to filter process 46 (FIG. 4).

In filter process 46, quadrature components of the ΔB(t) traces are filtered out, according to the process described in copending application U.S. Pat. No. 5,440,525, issued Aug. 8, 1995, assigned to Atlantic Richfield Company and incorporated herein by this reference. This quadrature filtering is permissible since only the in-phase components (including components 180° out of phase) of the slope deviation traces ΔB(t) have lithologic significance. Rather, such quadrature components of AVO slope B are believed to be due to velocity and dispersion errors in the NMO correction process, or to non-reflective components in the seismic wave (e.g., surface waves).

Following filter process 46, process 48 is next performed by system computer 30 to identify those points in A–ΔB space that fall within those polygons identified in the various quadrants of A–ΔB space that correlate to the tops and bottoms of Morrow sand formations. As discussed above relative to FIG. 2b, the +A/–ΔB quadrant contains points corresponding to the bottoms of Morrow sand formations, and the +A/–ΔB quadrant contains points corresponding to the tops of Morrow sands. After this analysis, process 50 may be performed by system computer 30 to generate an output plot, either on printer 28 or graphics display 27, in A–ΔB space, of selected points in the survey. The points output in process 50 may be all points in the survey falling within the indicated polygons; alternatively, the user of system computer 30 may select windows in the seismic survey traces to be plotted in A–ΔB space, so that specific regions of the survey may be specifically plotted for analysis.

Figure 8B:
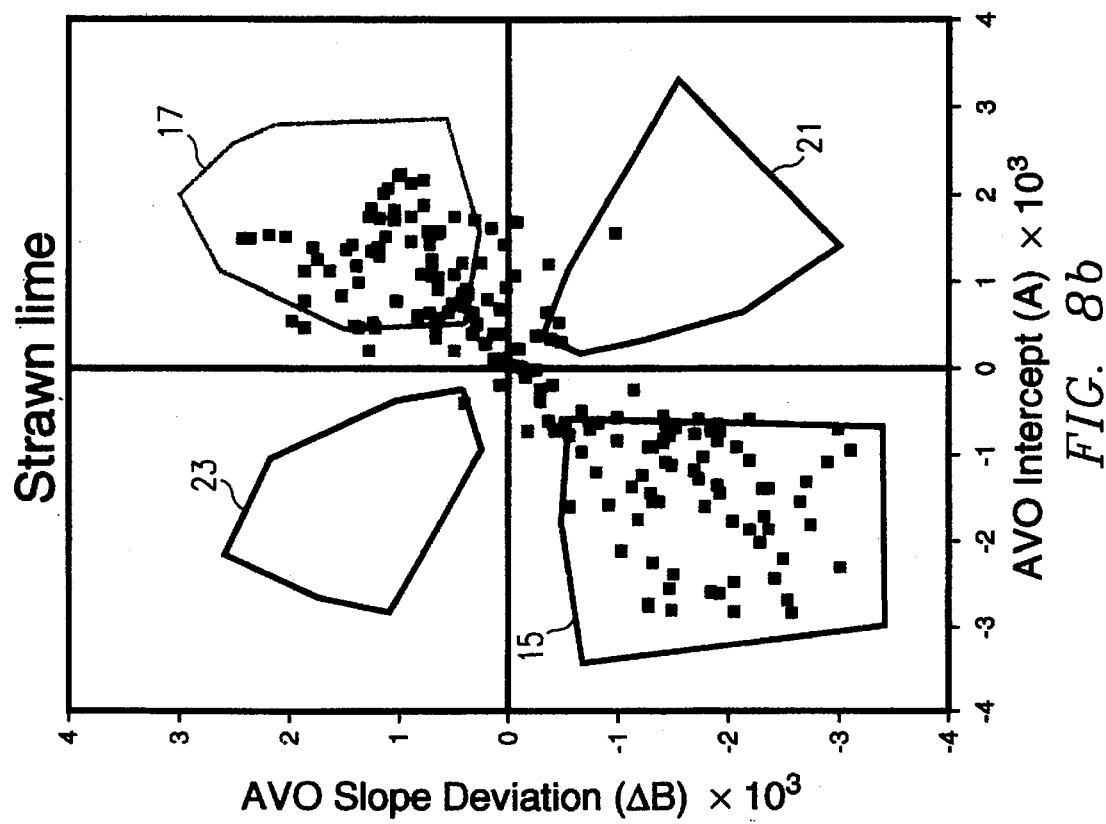
FIGS. 8a and 8b are plots of AVO amplitude versus deviation of AVO slope from the AVO trend line for Morrow sands and Strawn limestones, respectively, as produced according to the preferred embodiment of the invention.
Figure 8A:
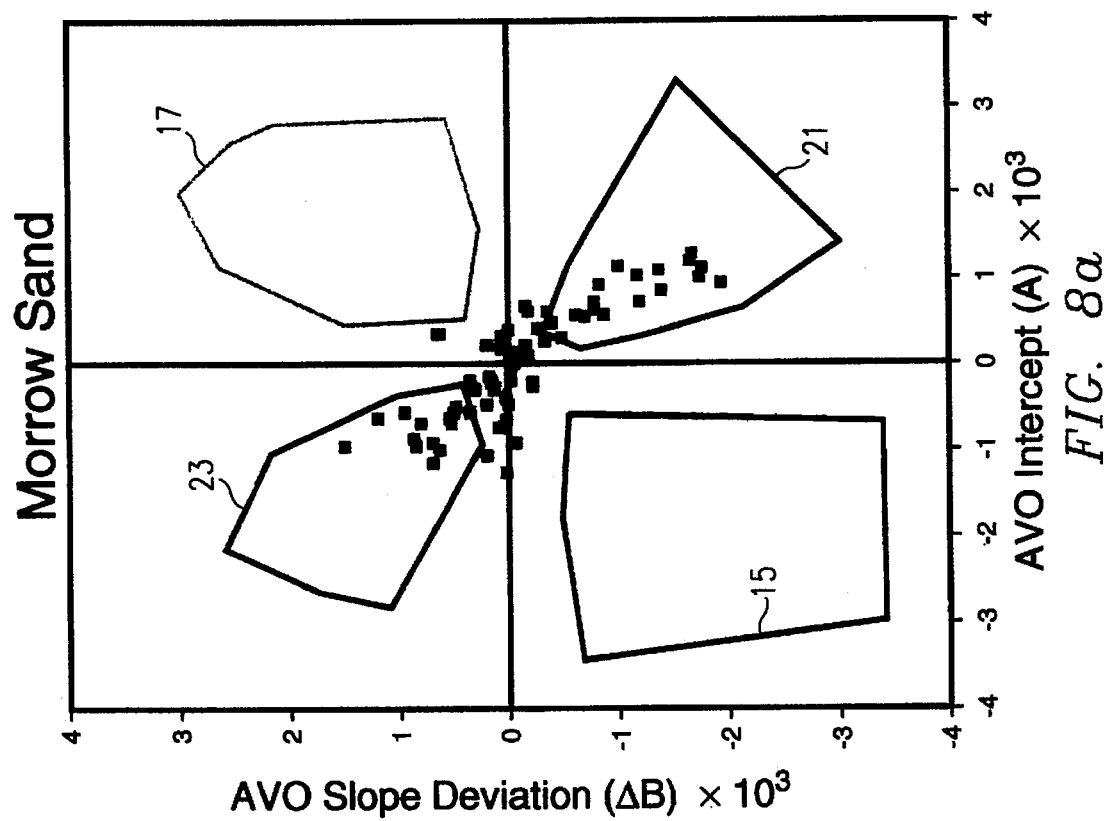

Referring now to FIGS. 8a and 8b, examples of plots generated according to the preferred embodiment of the invention, presented in A–ΔB space, will now be discussed. The plots presented in FIGS. 8a and 8b represent 30 msec time windows surrounding a known Morrow gas sand interval and a known limestone interval, respectively. As shown in FIG. 8a, points indicative of the top of a Morrow gas sand are indicated in polygon 21 while points indicative of the bottom of the gas sand are indicated in polygon 23. FIG. 8a has no points in either of polygons 15, 17, which are indicative of limestone interval interfaces. Conversely, as shown in FIG. 8b, points indicative of the top and bottom of a limestone interval are present in polygons 17, 15, respectively, while very few points are present in polygons 21, 23 (polygon 23 being totally empty). It is contemplated that system computer 30 will be able to readily identify, by way of color coding or the like, which points in the survey correspond to the points in the polygons, providing the geologist with a valuable tool in determining the location and depth of potentially production-worthy Morrow sand formations.

FIG. 9 is an example of a color display output of a selected line in a typical survey, presenting the results of an example of the method of the preferred embodiment of the invention as may be presented in process 50. In the plot of FIG. 9, each position along the horizontal axis corresponds to a common depth point (CDP) stack, and thus to a specific location at the surface of the earth with multiple depth points therebelow; the vertical axis is in the time domain (increasing time from top to bottom), and as such the vertical position of each point in the plot of FIG. 9 corresponds to the depth from the surface of the earth of its associated CDP.

Points in the plot of FIG. 9 are preferably color coded according to the polygons 15, 17, 21, 23 within which its AVO intercept value A and AVO slope deviation value ΔB lie in A–ΔB space, as shown in FIGS. 8a and 8b. For example, polygons 21, 23, in FIGS. 8a and 8b correspond to the top and bottom of Morrow sand formations, as described hereinabove. Referring to FIG. 9, region M1 points to a potential Morrow sand of reasonable size (over CDP stacks 610 to 630, at time-domain depths of from about 1.18 to 1.20 seconds), with the top of the Morrow sand indicated by red points (in polygon 21) and the bottom of the Morrow sand indicated by green points (in polygon 23). Region M2 of FIG. 9 similarly points to another potential Morrow sand, having similar behavior. The depth points at regions M1, M2 would, if plotted in A–ΔB space, would resemble the points plotted in FIG. 8a. Conversely, region L1 of FIG. 9 points to a limestone formation, with the top of the limestone indicated by yellow points (in polygon 17) and the bottom of the limestone indicated by blue points (in polygon 15); as such, points in region L1, if plotted in A–ΔB space, would resemble the points plotted in FIG. 8b.

In FIG. 9, the Morrow sand formations are relatively narrow (i.e., having widths of only a few CDP stacks), while the limestones are rather wide formations (i.e., extending along the entire survey line). This is because, as noted above, Morrow sands in North America typically correspond to ancient river and stream beds, and because this particular survey line is known to perpendicularly intersect these channels. Even though Morrow sands are both narrow and also acoustically similar to limestones and shales, FIG. 9 illustrates that the method of the present invention is able to clearly distinguish, from conventional seismic data, the location of Morrow sands from such neighboring and acoustically similar formations. These important hydrocarbon-bearing formations can thus be more successfully located and brought to production, through use of the present invention.

Other display types may, of course, be presented in process 50 according to the preferred embodiment of the invention, including alternative views of the survey. For example, an important display is a time slice in the survey that is arranged as a plan view; in other words, the display may select a time in the view of FIG. 9, and display the various colors of FIG. 9 in x-y space. This view would be useful in defining the surface location under which particular formations, such as a Morrow sand, is located. Other views and displays as are useful in the art will also be readily identified by those in the field having reference to this specification.

It is therefore apparent from this example that the method according to the preferred embodiment is able to distinguish Morrow sand from limestone formations by way of AVO analysis, in a way that was not possible using conventional AVO techniques. The method and system according to the present invention therefore provide the advantages of being able to provide high resolution analysis to distinguish important formations, from an economic viewpoint, that were previously indistinguishable. Furthermore, the method allows the use of normalizing techniques so that variations in geophone coupling and other effects are not present in the data being analyzed.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to analyze seismic survey signals to distinguish the presence of sand formations in a region of the earth corresponding to the seismic survey signals, wherein the seismic survey signals comprise a plurality of series of time-based signals obtained at a plurality of detectors at the earth responsive to seismic energy imparted to the earth, the signals being gathered into gathers of seismic survey signals, each gather representative of energy reflected from depth points below a corresponding one of a plurality of surface locations at a plurality of angles of incidence, the method comprising the steps of:

retrieving digital data from a memory corresponding to a first gather;

generating a first AVO stack by determining first and second AVO coefficient values for each of a plurality of depth points represented in the first gather.;

using the first and second AVO coefficient values from the first AVO stack, determining a trend line of the first AVO coefficient value versus the second AVO coefficient value;

for each of the plurality of depth points of the first AVO stack, determining a deviation value for the second AVO coefficient corresponding to the difference between its associated second AVO coefficient value and a second AVO coefficient value indicated by the trend line; and plotting, on a computer output device, the deviation value versus the first AVO coefficient value for each of the plurality of depth points of the first stack.

2. The method of claim 2, wherein the first AVO coefficient is an amplitude-versus-offset intercept value and wherein the second AVO coefficient is an amplitude-versus-offset slope value.

3. The method of claim 2, wherein the retrieving and generating are performed for a plurality of gathers, resulting in a plurality of AVO stacks.

4. The method of claim 3, wherein the step of determining a trend line is performed, for each of a plurality of selected depth points, by performing regression of the amplitude-versus-offset intercept values and amplitude-versus-offset slope values over a selected window of depth points and AVO stacks centered about the selected depth point.

5. The method of claim 2, wherein the retrieving step is performed for a plurality of gathers; and further comprising:

after the retrieving step, normalizing the amplitudes of the plurality of gathers.

6. The method of claim 2, wherein the step of determining the trend line comprises:

for each of the plurality of depth points, performing a least-squares-fit regression of the seismic signals to derive a first trace of amplitude-versus-offset intercept over time and a second trace of amplitude-versus-offset slope over time; and applying a minimum mean-squared error filter to the first and second traces to produce first and second filtered traces, respectively;

adjusting the second filtered trace by a factor corresponding to normal move-out stretch distortion; and then performing a regression of the amplitude-versus-offset intercept values in the first filtered trace and the amplitude-versus-offset slope values in the adjusted second filtered trace over a selected window of depth points about a selected depth point.

7. The method of claim 6, wherein the step of performing the least-squares-fit regression comprises a regression of the seismic signals to the equation:

$$S_j(t_j,\theta)=A(t_j)+B(t_j)\sin^2\theta+C(t_j)\sin^2\theta\,\tan^2\theta.$$

8. The method of claim 2, wherein the retrieving and generating are performed for a plurality of gathers, resulting in a plurality of AVO stacks;

and wherein the step of determining the trend line comprises:

retrieving from memory digital data corresponding to the amplitude-versus-offset intercept values and amplitude-versus-offset slope values of a plurality of depth points in selected ones of the plurality of AVO stacks neighboring one another;

for each of the selected ones of the plurality of AVO stacks, generating analytic traces of the amplitude-versus-offset intercept values and amplitude-versus-offset slope values;

determining root-mean-square amplitudes and a correlation coefficient over selected windows of depth points and analytic traces centered about selected depth points;

then performing a regression of the amplitude-versus-offset intercept values and amplitude-versus-offset slope values based upon the root-means-square amplitudes and correlation coefficient.

9. The method of claim 2, wherein the retrieving step is performed for the plurality of gathers;

and further comprising:

after the retrieving step, performing a spatial summation of the amplitudes of the plurality of gathers.

10. A computer-readable memory having a storage medium configured so that, when read and used by a computer, the computer is directed to analyze seismic survey signals comprising a plurality of series of time-based signals obtained at a plurality of detectors at the earth responsive to seismic energy imparted to the earth and gathered into gathers of seismic survey signals, each stack representative of energy reflected from depth points below a corresponding one of a plurality of surface locations at a plurality of angles of incidence, said computer directed by a plurality of operations comprising:

retrieving digital data from a memory corresponding to a first gather;

generating a first AVO stack by determining first and second AVO coefficient values for each of a plurality of depth points represented in the first gather;

using the first and second AVO coefficient values from the first AVO stack, determining a trend line of the first AVO coefficient value versus the second AVO coefficient value;

for each of the plurality of depth of the first AVO stack, determining a deviation value corresponding to the difference between its associated second AVO coefficient value and a second AVO coefficient value indicated by the trend line; and plotting, on a computer output device, the deviation value versus the first AVO coefficient value for each of the plurality of depth points of the first AVO stack.

11. The computer-readable memory of claim 10, wherein the first AVO coefficient value is an amplitude-versus-offset intercept value, and wherein the second AVO coefficient value is an amplitude-versus-offset slope value.

12. The computer-readable memory of claim 11, wherein the retrieving and generating steps are performed for each of a plurality of gathers, resulting in a plurality of AVO stacks;

and wherein the step of determining a trend line is performed, for each of a plurality of selected depth point, by performing regression of the amplitude-versus-offset intercept values and amplitude-versus-offset slope values over a selected window of depth points and stacks centered about the selected depth point.

13. The computer-readable memory of claim 11, wherein the retrieving step is performed for a plurality of gathers;

and further comprising:

after the retrieving step, normalizing the amplitudes of the plurality of gathers.

14. The computer-readable memory of claim 11, wherein the step of determining the trend line comprises:

for each of the plurality of depth points, performing a least-squares-fit regression of the seismic signals to derive a first trace of amplitude-versus-offset intercept over time and a second trace of amplitude-versus-offset slope over time; and applying a minimum mean-squared error filter to the first and second traces to produce first and second filtered traces, respectively;

adjusting the second filtered trace by a factor corresponding to normal move-out stretch distortion; and then performing a regression of the amplitude-versus-offset intercept values in the first filtered trace and the amplitude-versus-offset slope values in the adjusted second filtered trace over a selected window of depth points about a selected depth point.

15. The computer-readable memory of claim 11, wherein the retrieving and generating are performed for a plurality of gathers, resulting in a plurality of AVO stacks;

and wherein the step of determining the trend line comprises:

retrieving from memory digital data corresponding to the amplitude-versus-offset intercept values and amplitude-versus-offset slope values of a plurality of depth points in selected ones of a plurality of AVO stacks neighboring one another;

for each of the selected ones of the plurality of stacks, generating analytic traces of the amplitude-versus-offset intercept values and amplitude-versus-offset slope values;

determining root-mean-square amplitudes and a correlation coefficient over selected windows of depth points and analytic traces centered about selected depth points;

then performing a regression of the amplitude-versus-offset intercept values and amplitude-versus-offset slope values based upon the root-means-square amplitudes and correlation coefficient.

16. The computer-readable memory of claim 11, wherein the retrieving step is performed for a plurality of gathers;

and further comprising:

after the retrieving step, performing a spatial summation of the amplitudes of the plurality of gathers.

17. A digital computing system for analyzing seismic survey signals to distinguish the presence of sand formations in a region of the earth corresponding to the seismic survey signals, comprising:

a memory for storing data corresponding to a plurality of series of time-based signals obtained at a plurality of detectors at the earth responsive to seismic energy imparted to the earth and gathered into gathers of seismic survey signals, each gather representative of energy reflected from depth points below a corresponding one of a plurality of surface locations at a plurality of angles of incidence;

a graphics display output device; and a programmed computer, coupled to the memory and to the output device, for:

retrieving data from the memory corresponding to a first gather;

generating a first AVO stack by determining first and second AVO coefficients for each of a plurality of depth points represented in the first gather;

using the first and second AVO coefficient values from the first AVO stack, determining a trend line of the first AVO coefficient value versus the second AVO coefficient value;

for each of the plurality of depth points of the first AVO stack, determining a deviation value corresponding to the difference between its associated second AVO coefficient value and a second AVO coefficient value indicated by the trend line; and presenting, on the output device, the deviation value versus the first AVO coefficient value for each of the plurality of depth points of the first AVO stack.

18. The system of claim 17, wherein the first AVO coefficient value is an amplitude-versus-offset intercept value and wherein the second AVO coefficient value is an amplitude-versus-offset slope value.

19. The system of claim 18, wherein the retrieving and generating are performed for each of the plurality of stacks, resulting in a plurality of AVO stacks;

and wherein the step of determining a trend line is performed, for each of a plurality of selected depth points, by performing regression of the amplitude-versus-offset intercept values and amplitude-versus-offset slope values over a selected window of depth points and stacks centered about the selected depth point.

20. The system of claim 18, wherein the retrieving step is performed for the plurality of gathers;

and wherein the computer is further for:
normalizing the amplitudes of the plurality of gathers after the retrieving step.

21. The system of claim 18, wherein the step of determining the trend line comprises:

for each of the plurality of depth points, performing a least-squares-fit regression of the seismic signals to derive a first trace of amplitude-versus-offset intercept over time and a second trace of amplitude-versus-offset slope over time; and applying a minimum mean-squared error filter to the first and second traces to produce first and second filtered traces, respectively;

adjusting the second filtered trace by a factor corresponding to normal move-out stretch distortion; and then performing a regression of the amplitude-versus-offset intercept values in the first filtered trace and the amplitude-versus-offset slope values in the adjusted second filtered trace over a selected window of depth points and stacks about a selected depth point.

22. The system of claim 18, wherein the retrieving and generating are performed for a plurality of gathers, resulting in a plurality of AVO stacks;

and wherein the step of determining the trend line comprises:

retrieving, from the memory, digital data corresponding to the amplitude-versus-offset intercept values and amplitude-versus-offset slope values of a plurality of depth points in selected ones of the plurality of AVO stacks neighboring one another;

for each of the selected ones of the plurality of AVO stacks, generating analytic traces of the amplitude-versus-offset intercept values and amplitude-versus-offset slope values;

determining root-mean-square amplitudes and a correlation coefficient over selected windows of depth points and analytic traces centered about selected depth points;

then performing a regression of the amplitude-versus-offset intercept values and amplitude-versus-offset slope values based upon the root-means-square amplitudes and correlation coefficient.

23. The system of claim 18, wherein the retrieving step is performed for the plurality of gathers;

and wherein the computer is also for:
performing a spatial summation of the amplitudes of the plurality of gathers after the retrieving step.

24. The system of claim 18, wherein the graphics display output device comprises a video display.

25. The system of claim 18, wherein the graphics display output device comprises a printer.

* * * * *